United States Patent [19]

Harand et al.

[11] Patent Number: 5,447,011
[45] Date of Patent: Sep. 5, 1995

[54] PRODUCT WITH REDUCED H₂S CONTENT AND A PROCESS OF MAKING THE SAME

[75] Inventors: Ralf Harand, Fürth; Hans Gärtner, Igensdorf; Peter Iwatschenko, Neunkirchen/Brand; Carl Jürgen, Nürnberg, all of Germany

[73] Assignee: Kabi Pharmacia GmbH, Erlangen, Germany

[21] Appl. No.: 131,417

[22] Filed: Oct. 4, 1993

[30] Foreign Application Priority Data

Oct. 7, 1992 [DE] Germany .............. 42 33 817.4

[51] Int. Cl.⁶ ............................................. B65B 31/00
[52] U.S. Cl. ........................................ 53/428; 53/403; 53/434; 53/449; 53/474; 206/204; 206/205; 426/118; 426/124; 426/395
[58] Field of Search ............ 206/204, 205, 213.1; 426/118, 124, 395, 398; 53/400, 403, 428, 474, 432, 434, 445, 449

[56] References Cited

U.S. PATENT DOCUMENTS

| | | | |
|---|---|---|---|
| 2,524,162 | 10/1950 | Chavannes et al. | 53/449 X |
| 3,415,702 | 12/1968 | Bauder . | |
| 3,670,874 | 6/1972 | Brunner | 206/204 |
| 4,247,565 | 1/1981 | Raisch et al. | 426/118 X |
| 4,813,210 | 3/1989 | Masuda et al. | 53/449 X |
| 4,840,823 | 6/1989 | Chigami et al. | 426/118 X |
| 4,852,732 | 8/1989 | Wilski et al. | 206/204 |
| 4,861,632 | 8/1989 | Caggiano | 206/204 X |
| 4,908,151 | 3/1990 | Inoue et al. . | |
| 4,931,360 | 6/1990 | Hoshino et al. | 426/118 X |
| 4,998,400 | 3/1991 | Suzuki et al. | 53/449 X |
| 5,011,019 | 4/1991 | Satoh et al. | 206/530 |
| 5,217,118 | 6/1993 | Mochizuki et al. | 206/205 X |
| 5,267,646 | 12/1993 | Inoue et al. | 206/204 |
| 5,286,407 | 2/1994 | Inoue et al. | 206/204 X |

FOREIGN PATENT DOCUMENTS

| | | |
|---|---|---|
| 0229380 | 7/1987 | European Pat. Off. . |
| 0340662 | 11/1989 | European Pat. Off. . |
| 0366254 | 5/1990 | European Pat. Off. . |
| 7102869.8 | 1/1971 | Germany . |
| 82658237 | 10/1977 | Germany . |
| 2754708 | 6/1978 | Germany . |
| 4011210A1 | 10/1990 | Germany . |
| 2213038 | 8/1989 | United Kingdom . |

OTHER PUBLICATIONS

Article entitled "New Oxygen Absorbing System increases . . . Shelf Life" from Food Engineering, Jun. 1989.

27-page brochure (in English) entitled "Ageless ®—A New Age in Food Preservation" (Mitsubishi Gas Chemical Co., Inc.).

4-page brochure (in German) entitled "Sauerstoffaufsauger AGELESS ®".

*Primary Examiner*—John Sipos
*Assistant Examiner*—Daniel Moon
*Attorney, Agent, or Firm*—Synnestvedt & Lechner

[57] ABSTRACT

A product in a closed container, (A) the product releasing and/or containing H₂S, and (B) the container being permeable to gases, another container, largely impermeable to gases and holding an H₂S absorber, being arranged around said container. The product especially may be infusion solutions containing substances which can release or generate H₂S, in addition to other amino acids, if desired. The solutions according to the invention clearly are more durable and contain less H₂S than comparable known solutions of the art.

12 Claims, No Drawings

PRODUCT WITH REDUCED H$_2$S CONTENT AND A PROCESS OF MAKING THE SAME

The invention relates to products having a reduced content of H$_2$S. The invention especially is concerned with a product in a vessel or container, which product releases and/or contains H$_2$S. Moreover, the invention relates to a process of reducing the H$_2$S content of the product.

In the present context the "product" is understood to comprise solids, pastes, solutions, mixtures, and the like, especially pharmaceuticals and foodstuffs.

Products yielding hydrogen sulfide as their decomposition product are known in the art. Hydrogen sulfide is highly toxic and stinks. Hydrogen sulfide (H$_2$S) particularly forms in solution containing sulfurous amino acids. Solutions of that kind, for example, contain acetyl cysteine or cysteine. Heating for purposes of sterilization cannot be dispensed with, especially where infusion or nutrient solutions are concerned. And, as these amino acids are not thermally stable, the heating necessarily leads to decomposition and thus to the formation of hydrogen sulfide.

No process or product has become known, up to the present time, by which the formation of hydrogen sulfide and the disadvantages involved could be avoided.

In the prior art, therefore, the formation of H$_2$S always has been put up with in the case of solutions which release or contain hydrogen sulfide, in order to guarantee effective protection of other substances from oxidation by oxygen. However, demand exists for a reduction of the H$_2$S content, above all, in the production of sterilized pharmaceuticals and foodstuffs which contain acetyl cysteine and cysteine.

It is, therefore, the object of the instant invention to provide a product in a closed container, the product especially being an infusion or nutrient solution which contains amino acids and in which H$_2$S may form or has formed already, this product being or becoming widely freed of H$_2$S.

That object is met, essentially, in that the product containing or releasing H$_2$S is placed in a gas permeable container and an H$_2$S absorber is arranged in the direct vicinity thereof.

The subject matter of the invention thus is a product having a reduced H$_2$S content, obtainable by introducing a solution, which releases or contains H$_2$S, in a gas permeable container, closing said container, and locating an H$_2$S absorber directly adjacent said container.

In other words, the invention relates to a product in a closed container, (A) the product releasing and/or containing H$_2$S, and (B) the container being permeable to gases, an H$_2$S absorber being arranged directly adjacent the container. Another container, largely impermeable to gases, is arranged with advantage around said container and may serve as a means of protection against the entry of oxygen.

In the present context, gas permeable is understood to mean also that the container may be permeable to H$_2$S only under those external conditions under which H$_2$S release from the product does occur.

The container which is largely impermeable to gases also may be made of a material through which gas, such as H$_2$S, does not permeate, or in minor quantities only, at the usual conditions of shelving at room temperature.

The H$_2$S absorber preferably is finely ground iron. The products mentioned above may contain amino acids. Of particular interest are amino acid solutions which contain tryptophan. Preferred substances which may act as oxidation protectors in the solutions according to the invention contain cysteine, N-acetyl cysteine, N,N'-diacetyl cysteine or amino acids containing cystin, or other homologous sulfurous amino acids. Under heat, these compounds readily release H$_2$S.

The invention, for the first time, provides a product which permits to get under control the problems caused by toxic H$_2$S. More specifically, it has now become possible to manufacture sterilized pharmaceuticals and foodstuffs containing acetyl cysteine and cystin which consumers no longer will reject purely for their unpleasant smell. Furthermore, hardly any precipitations of low solubity including trace elements can be observed in solutions according to the invention.

In any case, the invention makes it possible to store products developing or containing hydrogen sulfide gas for extended periods of time.

In this manner the invention particularly also satisfies the need for a product which is protected against oxidation, and which can be produced in simple manner and disposes of the requisite stability for storage.

The invention is easily reduced to practice in that products containing or releasing H$_2$S are introduced into a container made of plastic material which is permeable in particular to hydrogen sulfide. Any hydrogen sulfide gas which develops, for instance, during thermal sterilization or heat treatment will diffuse readily through the plastics of which the container is made in order then to be absorbed by the absorber. In principle, any substance that readily yields sulfides, especially metal and metal salts, applied on a suitable carrier if desired, can be used as absorber for H$_2$S.

The absorber located in the space between outer and inner containers makes sure that the hydrogen sulfide concentration is especially low in this intermediate space. As a consequence, the hydrogen sulfide concentration gradient between the inner and outer containers, driving the diffusion, is almost at its maximum. This means that the hydrogen sulfide diffuses at a high diffusion rate from the inner container into the intermediate space. The practical consequence is that infusion solutions which contain sulfurous amino acids and are filled in plastic bags, for instance, will have only very low H$_2$S concentrations left in the solution after just a few days so that there will be no unpleasant odor, and they will be ready for sale and use. Especially in the event that the aqueous solution is filled into a gas permeable inner container and, at the same time, surrounded by another container which is largely impermeable to gases, being made of plastics for example, the H$_2$S absorber warrants that, upon opening of the outer container, no nuisance will be caused by a distinct smell due to the development of hydrogen sulfide.

A preferred hydrogen sulfide absorber is made of finely ground iron powder. In principle, however, any hydrogen sulfide absorber is conceivable. For example: arsenic, antimony, tin, mercury, bismuth, cadmium, nickel, cobalt, manganese, zinc, aluminum, and their salts or other compounds.

The absorber either can be filled, as fine powder, into permeable vessels (e.g. small bags of plastics or paper) or applied on a carrier, such as paper strip. Furthermore, it is conceivable to surround the inner container, including the aqueous solution, almost entirely with the absorber and, if desired, apply an outer coating that is largely impermeable to gases.

It is especially advantageous if the H₂S absorber, at the same time, can act as an absorber for oxygen. In this event the diffusion of oxygen into the solution, in addition, can be limited effectively. That affords very special advantages if another container, largely impermeable to gases, is provided around the inner container as well as the H₂S absorber. Then the H₂S absorber will absorb both hydrogen sulfide and oxygen. In this manner long-term stability of the solutions according to the invention is effectively guaranteed.

It is thus a specific advantage of the invention that, above all, infusion solutions containing cysteine can be provided by virtue of the use of an H₂S absorber, and that these can be produced with terminal sterilization in a plastic bag and a gas tight outer bag of a quality suitable for parenteral application. No smell of hydrogen sulfide will be released when the external bag is opened. Moreover, no precipitations occur when trace elements are added that form sulfides which are difficult to dissolve.

The subject matter of the invention likewise is a process of preparing a product which is protected against oxidation by oxygen. To accomplish that, first, a substance is added to a product which is to be protected from oxidation by oxygen, said substance being added in an amount which would warrant sufficient protection against oxidation under the conditions of the process and subsequent use, the substance and/or its oxidation product(s) being capable of releasing H₂S. Thereupon, the product and the substance together are filled into a container which is permeable to gases, and finally, the closed container is surrounded by another container which is largely impermeable to gases and in which an H₂S absorber is placed. During the process, sterilization by heat is effected, if desired.

Substances which would guarantee sufficient protection, within the meaning of the subject matter of the invention, under the conditions of the process and subsequent use, in particular, are the amino acids mentioned above, as well as acetyl cysteine and cysteine. In addition, sulfites are suitable for the purpose indicated. Sufficient protection in this case means that the quantity is sufficient to warrant that the product is protected to an extent sufficient for its usefulness in consideration of the thermal and other influences which are to be expected under normal conditions during production and subsequent storage. It is easy for a person skilled in the art to determine these quantities by simple testing. Substances within the meaning of the invention, in any case, comprise those substances which release H₂S or whose oxidation products do so. This release may occur at the usual room temperature or under heat, especially under sterilizing conditions. The quantity of absorber included in the external gas permeable container should be sufficient to absorb the H₂S released which diffuses through the inner container into the intermediate space between the containers. Simple testing will reveal the required amounts to those skilled in the art.

Moreover, the actual dimensions of the containers are not critical in the context of the invention. The outer container simply should be big enough in any case to house the inner container and the absorber. On the other hand, the volume enclosed should be no greater than twice the volume of the internal container.

The invention will be described in greater detail below with reference to examples.

EXAMPLE 1

This example was intended to determine to what extent commercially available oxygen absorbers could be used with the invention.

50 ml of an aqueous 0.09 mol/l Na₂S solution and 10 ml of concentrated HCl each were filled into bags made of gas permeable film. The quantities were selected such that a quantity of H₂S would result which corresponded to the guaranteed minimum oxygen absorption capacity of a commercially available, small absorber bag. The filled bags were placed in external bags made of a material which is substantially impermeable to gases and were accompanied by different small absorber bags, and then the outer bags were sealed. The test samples were stored for a short time, and the amount of hydrogen sulfide which had accumulated in the intermediate space between the inner and outer bags was determined analytically.

For comparison, bags were filled in accordance with the above indications and placed in external bags, yet without the addition of an absorber.

The results of these tests are summarized in the table below.

TABLE 1

|  | comparison | absorber type 1 | type 2 | type 3 |
|---|---|---|---|---|
| quantity of H₂S in μm/l | >>850 (above detection limit) | <1 (below detection limit) | 10 | 4 |

The example demonstrates that the invention can be realized successfully with commercially available types of absorbers. Furthermore, the test results clearly prove that a higher quality of conventional infusion solutions can be achieved by the invention. This is a direct result of the fact that hardly any toxic H₂S remains in the solution and that no precipitations of metal sulfides can occur when trace element solutions are added prior to use.

EXAMPLE 2

It was examined to what degree the H₂S content could be reduced in solutions containing cysteine and being subjected to terminal sterilization.

A solution was prepared which contained 1 g/l of cysteine. The solution was filled into bags according to example 1 and these were placed, together with an H₂S absorber (based on iron), in external bags which were practically impermeable to gases. These bags then were sterilized at 121° C.

For comparison, bags were prepared without absorber.

After short-term storage the content of hydrogen sulfide in the solutions was determined. The comparative solution showed a content of 516 μg/l of H₂S. By contrast, the solutions according to the invention contained no more than 68 μg/l.

This example clearly demonstrates that the invention, in contrast to the prior art, can resolve the problem of the formation of H₂S. The hydrogen sulfide content is distinctly reduced.

What is claimed is:

1. A packaged product comprising a pharmaceutical or foodstuff and an oxygen absorber and wherein said product contains H₂S or on decomposition releases H₂S, said product being held in an inner container that is permeable to gaseous H$_2$S, said inner container and its contents being held in an outer container that is substantially impermeable to oxygen, an H$_2$S absorber being held in said outer container and wherein said inner and outer containers are positioned so that the inner container forms an H$_2$S permeable interface that separates the product and the H$_2$S absorber.

2. A packaged product according to claim 1 wherein the H$_2$S absorber is finely ground iron.

3. A packaged product according to claim 1 wherein said pharmaceutical or foodstuff contains an amino acid.

4. A packaged product according to claim 3 wherein said pharmaceutical or foodstuff contains tryptophan.

5. A packaged product according to claim 1 wherein the oxygen absorber is a sulfurous amino acid.

6. A packaged product according to claim 5 wherein the oxygen absorber is cysteine, N-acetyl cysteine, N$_1$N-diacetyl cysteine, amino acids containing cystin or other homologous sulfurous amino acids.

7. The process for protecting a pharmaceutical or foodstuff product from oxidation by oxygen during thermal sterilization or storage and involving adding thereto an oxygen absorber in an effective amount for reducing the oxidation of said product and wherein said oxygen absorber contains H$_2$S or on decomposition releases H$_2$S, confining the product and the oxygen absorber in an inner container that is permeable to gaseous H$_2$S, holding said inner container and an H$_2$S absorber in a closed outer container that is substantially impermeable to oxygen, and with the H$_2$S permeable container separating said product from said H$_2$S absorber, and thereafter alternatively subjecting said product to either storage or thermal sterilization.

8. The process according to claim 7 wherein the H$_2$S absorber is finely ground iron.

9. The process according to claim 7 wherein said pharmaceutical or foodstuff contains an amino acid.

10. The process according to claim 9 wherein said pharmaceutical or foodstuff contains tryptophan.

11. The process according to claim 7 wherein the oxygen absorber is a sulfurous amino acid.

12. The process according to claim 11 wherein the oxygen absorber is cysteine, N-acetyl cysteine, N$_1$N-diacetyl cysteine, amino acids containing cystin or other homologous sulfurous amino acids.

* * * * *

UNITED STATES PATENT AND TRADEMARK OFFICE
CERTIFICATE OF CORRECTION

PATENT NO. : 5,447,011
DATED : September 5, 1995
INVENTOR(S) : Ralf Harand, Hans Gärtner, Peter Iwatschenko, and Carl-Jürgen Voss It is certified that error appears in the above-indentified patent and that said Letters Patent is hereby corrected as shown below:

On the title page, item [75], the Inventor information should appear as follows:

Ralf Harand, Fürth; Hans Gärtner, Igensdorf; Peter Iwatschenko, Neunkirchen/Brand; Carl-Jürgen Voss, Nürnberg, all of Germany Signed and Sealed this Twelfth Day of December, 1995

BRUCE LEHMAN

*Commissioner of Patents and Trademarks*